UNITED STATES PATENT OFFICE.

THOMAS F. HENLEY, OF LONDON, ASSIGNOR TO THE DATE COFFEE COMPANY, (LIMITED,) OF WALBROOK, LONDON, ENGLAND.

TABLE-BEVERAGE.

SPECIFICATION forming part of Letters Patent No. 237,273, dated February 1, 1881.

Application filed December 20, 1880. (No specimens.) Patented in England November 13, 1880.

*To all whom it may concern:*

Be it known that I, THOMAS FREDERICK HENLEY, a subject of the Queen of Great Britain, residing at London, England, have invented an Improved Mode of Treating Date Fruit and its Seed, (for which I have received Letters Patent in England, No. 4,677, dated November 13, 1880;) and I do hereby declare that the following is a full, clear, and exact description of the invention, which will enable others skilled in the art to which it appertains to make and use the same.

The object of this invention is to treat the date fruit in a manner so as to render it suitable for the production of a beverage or beverages of the nature of coffee or cocoa. For this purpose I take the date fruit as imported and subject it to a regulated amount of torrefaction, preferably in a close retort or oven, in such a manner as to convert the parenchyma or substance of the fruit into a high-flavored bitter material. The said retort or oven may be furnished with an outlet-pipe placed in communication with a condensing worm or surface jacketed by a vessel or cistern containing cold water, in such manner as to condense the vapor arising from the fruit under operation within the retort or oven aforesaid, and thereby obtain a by-product in the form of a valuable essential oil, as also of an acid liquor resembling, and which may be employed as an agreeable substitute for, ordinary vinegar. Such an apparatus is old in itself; and when it is not desired to save the by-products any suitable roasting-oven similar to those used in roasting coffee may be used.

The dried dates, when removed from the retort or oven, are preferably subjected to the action of a revolving drum or scrubbing-machine having a wire-gauze or perforated surface, through the texture of which the pulverized parenchyma of the fruit passes, leaving the seeds, as aforesaid, in a cleansed separate state. Any other suitable means may be employed for separating the pulp and seed. The seeds are now to be roasted, after the ordinary manner of coffee or cocoa, and then ground to a coarse powder in any ordinary and well-known mill for that purpose. The said seed-powder is now to be added to the powdered fruit-pulp, as aforesaid, the mixture of the two being employed in the manner of coffee or cocoa, producing a perfectly wholesome and nutritious beverage of the nature of these substances.

Having fully described my invention, what I desire to claim and secure by Letters Patent is—

The process herein described of treating date fruit, the same consisting, essentially, in first subjecting the whole fruit to torrefaction, then separating the pulp from the seeds, then roasting and grinding the seeds and mixing the resulting powder with the pulp, whereby is produced a substance or preparation suitable for use for the production of wholesome and nutritious beverages.

In witness whereof I have hereunto signed my name in the presence of two subscribing witnesses.

THOMAS FREDERICK HENLEY.

Witnesses:
RICHARD CORE GARDNER,
HENRY J. GARDNER.